Nov. 7, 1961     R. E. PASSMORE     3,007,490

ROTARY VALVE CONTROL

Filed June 26, 1958

Inventor
Ronald E. Passmore
by Erwin Koppel
Attorney

United States Patent Office 3,007,490
Patented Nov. 7, 1961

3,007,490
ROTARY VALVE CONTROL
Ronald E. Passmore, Valois, Quebec, Canada, assignor to Allis-Chalmers Manufacturing Company, Milwaukee, Wis.
Filed June 26, 1958, Ser. No. 744,745
12 Claims. (Cl. 137—599)

This invention relates to a control system for a valve element, and more particularly to a control system providing a sequential operation for a rotary valve and its associated seal.

In the penstock for a hydraulic turbine the water is under great pressure. To shut off the water pressure from the hydraulic turbine a rotary valve may be placed in the penstock. Because of the great pressure in the penstock, it is necessary to use a sealing means with the rotary valve. This sealing means may take the form of a sliding seal which can be closed by the hydraulic pressure in the penstock to seal the valve in the pressure pipe housing at the penstock. It is important that there be a sequence of operation between the rotary valve and its associated seal. The valve must be closed before the seal is forced into sealing engagement, and the seal must be retracted from sealing engagement before the valve is opened. This sequence of operation prevents damage to the sealing element due to the great pressure in the penstock and the opening and closing movement of the valve.

Accordingly, it is an object of the present invention to provide a control system that will insure a sequential operation between a rotary valve and its associated seal.

Another object of the present invention is to provide a control system for a rotary valve and its associated seal that will retract the seal before the valve is opened and will close the valve before the seal is placed in sealing position.

A further object of the present invention is to provide a control system for a rotary valve and its associated seal that will mechanically insure a sequential operation of the valve and seal during opening and closing of the valve.

Still another object of the present invention is to provide a control system for a rotary hydraulic valve and its associated seal that is hand operated from a common source to insure a sequential operation between the valve and its associated seal during the opening and closing of the valve.

Other objects and advantages will appear from the following description considered in conjunction with the attached drawing, in which.

Figure 1:
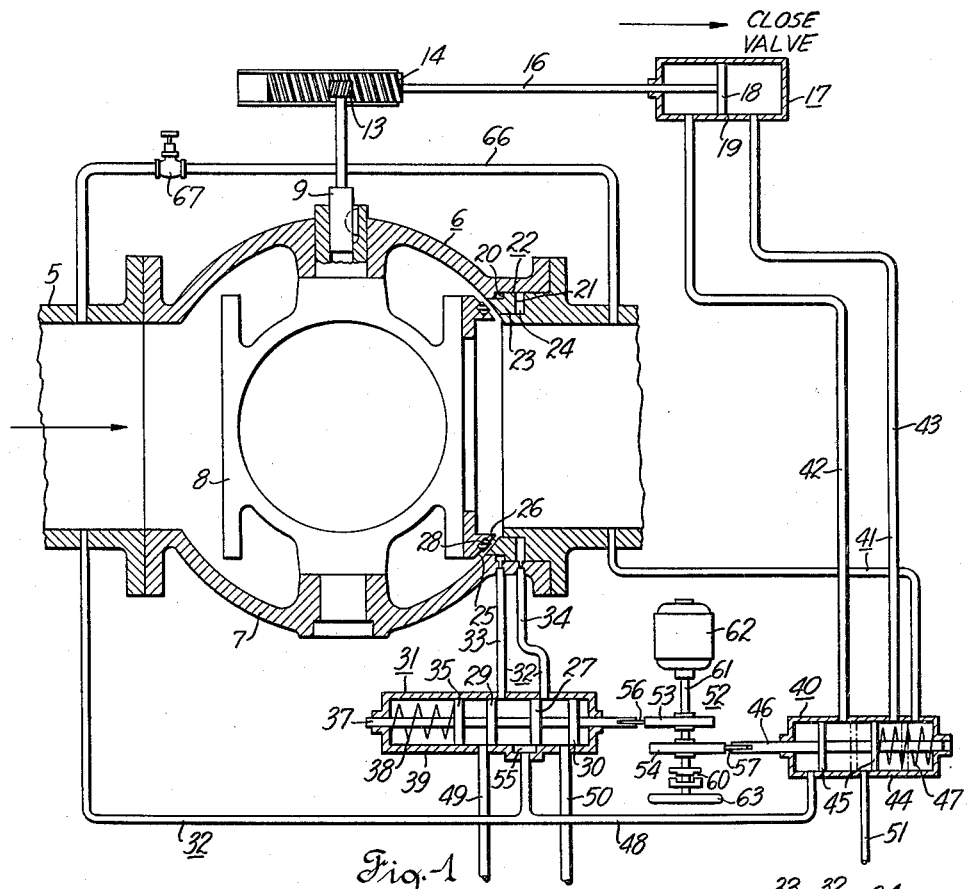
FIG. 1 is a sectional view, partly schematic, showing the rotary valve and its associated control system with the rotary valve closed and the seal in retracted position.

Referring to FIG. 1 by characters of reference, the hydraulically operated mechanism is shown as including a pressure fluid containing means, shown in the illustrated embodiment as pressure pipe 5 and rotary valve assembly 6 of a penstock installation. The direction of the flow of fluid in pipe 5 is shown by the arrow, and the flow of fluid is directed through rotary valve assembly 6 to a hydraulic turbine (not shown). The rotary valve assembly 6 includes a valve housing 7 connected in a conventional manner with pressure pipe 5. A rotary valve 8 is rotatably mounted in housing 7 on a shaft 9 which is journaled in housing 7. An extension of shaft 9 has a pinion gear 13 fastened at the end thereof. Gear 13 is in mesh with a rack 14 so that longitudinal movement of rack 14 will cause shaft 9 to rotate so that valve 8 will assume the open or closed position to regulate the starting and stopping of the flow of pressure fluid in the pressure fluid containing means. In FIG. 1, rotary valve 8 is shown in the closed position.

Rack 14 is connected to a rod 16 which is part of the valve operating means, shown as servomotor assembly 17. Rod 16 terminates within servomotor assembly 17 in a piston 18 slidably mounted in the servomotor cylinder 19.

A sealing assembly shown as seal 22 is slidably mounted within said pressure fluid containing means. As shown in FIG. 1, seal 22 includes an annular piston 23 mounted for longitudinally sliding movement in an annular chamber 24 formed in valve housing 7. Piston 23 has a surface 21 formed on the right or downstream end thereof and a surface 20 formed intermediate of the ends of piston 23 and this surface 20 faces upstream. It will be seen that surface 21 encompasses a larger area than surface 20. Movement of piston 23 toward valve 8 to the upstream end of chamber 24 will place an upstream surface 26 on the left or upstream end of piston 23 in abutting relationship with surface 25 of valve 8. It will be seen that surface 25 on valve 8 and adjacent surface 26 are formed at complementary angles to provide for a surface to surface abutting relationship. A resilient angular ring 28, which may be formed of rubber, is mounted in surface 25 to protrude slightly therefrom. When surface 26 of piston 23 is forced against surface 25 of valve 8, rubber ring 28 is thereupon compressed to help form a tight hydraulic seal.

A first valve means shown as sliding valve assembly 31 is hydraulically connected between seal 22 and an upstream portion of pressure pipe 5. This hydraulic connection from the upstream portion of pressure pipe 5 to sealing chamber 24 is shown as a first conduit 32. Part of hydraulic connection 32 directly connects valve 31 to seal 22 and includes two conduits shown as a first portion 33 connected to the upstream end of chamber 24 near surface 20 and a second portion 34 connected to the downstream end of chamber 24 near surface 21. First portion 33 is connected so as to be able to direct pressure fluid passing therethrough against surface 20 thereby tending to force seal 22 to retract from contact with valve 8, and second portion 34 is connected so as to direct pressure fluid passing therethrough against surface 21 tending to force seal 22 into sealing engagement with valve 8.

Valve assembly 31 includes a housing 39 having a longitudinal rod 37 slidably mounted therein with a spool 27 mounted approximately intermediate its length and spools 29 and 30 positioned to each side of spool 27. A spring 38 is positioned between a disk 35 mounted on rod 37 and one end of assembly 31 so as to bias rod 37 to the right, as shown in FIG. 1.

Figure 3:
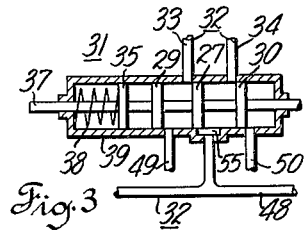
FIG. 3 is a schematic sectional view of the seal valve assembly positioned to effect engagement of the seal.
Figure 4:
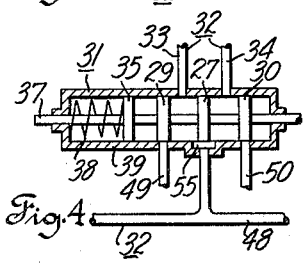
FIG. 4 is a view similar to FIG. 3 showing the seal valve assembly positioned to maintain the seal in retracted position with equalized fluid pressure on opposite sides thereof.

When valve assembly 31 is positioned as shown in FIG. 1, pressure fluid in conduit 32 flows through first portion 33 and acts on surface 20 tending to retract seal 22 from sealing engagement. When valve assembly 31 is positioned as shown in FIG. 3, pressure fluid in conduit 32 flows through second portion 34 and acts on surface 21 tending to force seal 22 into sealing engagement. When valve assembly 31 is positioned as shown in FIG. 4, pressure fluid in conduit 32 flows in the same direction through both first portion 33 and second portion 34 to direct the same pressure on opposing sides of seal 22, as will be explained more in detail hereinafter.

A second valve means shown as sliding valve assembly 40 is hydraulically connected between the valve operating means 17 and a downstream portion of pressure pipe 5. This hydraulic connection is shown in FIG. 1 by second conduit 41. Another connection shown as third conduit 42 hydraulically connects one end of servomotor 17 to one end of valve assembly 40. That part of conduit 41 connecting the other end of valve 40 to the other end of servomotor 17 is shown as a first part 43. The flow of pressure fluid through third conduit 42 (which will be explained further hereinafter) forces piston 18 to the right causing rotation of shaft 9 in one direction to close valve 8. The flow of pressure fluid through first part 43 forces piston 18 to the left causing rotation of shaft 9 in the other direction to open valve 8.

Valve assembly 40 includes a housing 44 within which is positioned a pair of longitudinally spaced spools 45 mounted on a sliding rod 46. A spring 47 mounted in one end of valve 40 biases spools 45 to the left as shown in FIG. 1 tending to maintain spools 45 in the full line position shown. In this full line position of spools 45 the downstream pressure flowing through second conduit 41 is directed through first part 43 to force piston 18 to the left to open valve 8.

Sliding valve 40 is also hydraulically connected between an upstream portion of pressure pipe 5 and the servomotor 17. Part of this upstream connection includes third conduit 42, and part includes a fourth conduit 48 connecting sliding valve 40 with first conduit 32. It will be seen that when spools 45 are moved to the dotted line position shown in FIG. 1, the flow of pressure fluid from the upstream portion of pressure pipe 5 is directed through fourth conduit 48 directly into third conduit 42 to force piston 18 to the right to close valve 8.

A first exhaust outlet 49 and a second exhaust outlet 50 extend from sliding valve 31, and a third exhaust outlet 51 extends from sliding valve 40 to allow fluid to drain out of the control system.

Figure 2:
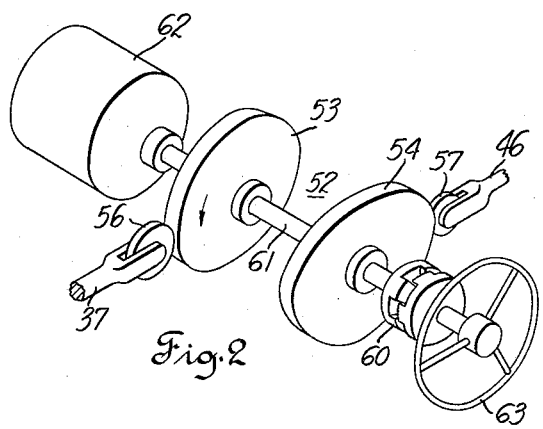
FIG. 2 is an isometric view showing the cam means in the control system.

A cam means 52 is operatively associated with sliding valves 31 and 40 to insure the proper sequential operation of valve 8 and seal 22. As clearly illustrated in FIG. 2, cam means 52 includes a first cam 53 in rolling contact with a follower roller 56 rotatably mounted on the end of rod 37 and a second cam 54 in rolling contact with a follower roller 57 rotatably mounted on the end of rod 46. The bias of springs 38 and 47 maintains followers 56 and 57 in contact with cams 53 and 54, respectively. Cams 53 and 54 are mounted on a common shaft 61 that is driven by motor 62.

The exact shape of cams 53 and 54 are not specifically illustrated or described herein; it being understood that the profile of each cam is formed in a conventional manner to give specific displacement to followers 56 and 57 when desired during the operating cycle. For example, when follower 56 is displaced to the right by spring 38, as shown in FIG. 1, to allow upstream pressure through first portion 33 to retract seal 22, follower 57 at the same time will rotate without longitudinal movement where it has been displaced to the right so that upstream pressure through third conduit 42 will maintain valve 8 closed. When seal 22 is fully retracted, continued rotation of the cam exposes a shorter radius of cam 54 to roller 57 so that valve spools 45 are forced to the left to the full line position and downstream pressure through second conduit 41 to servomotor 17 causes valve 8 to open. After seal 22 is retracted and valve 8 has been opened, cam 53 exposes a greater radius to follower 56 to force valve assembly 31 into the position, shown in FIG. 4, where pressure fluid flows through both portions 33 and 34 to exert equal fluid pressure on both surfaces 20 and 21. This same pressure is also exerted on surface 26, and since the projected, effective area of surfaces 20 and 26 is equal to the area of surface 21, the opposing hydraulic forces are substantially equal, and the seal can be considered to be in hydraulic balance in the retracted position shown in FIG. 4. In the retracted position of seal 22 when valve 8 is open, it is desirable to have continuous upstream pressure on surface 21, as well as surface 20, to prevent water leakage around seal 22. Water in pipe 5 generally contains silt and other impurities, and if it were permitted to leak past the packing around seal 22, it would cause undue wear on the packing. It should be realized that the system is operated for the greatest length of time with valve 8 open and seal 22 retracted so the positioning of valve assembly 31, as shown in FIG. 4, with upstream pressure on surface 21 is important for proper maintenance of the seal packing.

To close valve 8 a larger radius of cam 54 displaces follower 57 and spools 45 to the right allowing the upstream pressure to flow through fourth conduit 48 and third conduit 42 into servomotor 17 to close valve 8. While valve 8 is being closed, follower 56 rotates without longitudinal movement where it has been displaced to the left (as shown in FIG. 1) to maintain seal 22 in its retracted position. When valve 8 is completely closed, continued rotation of cam 53 exposes a larger radius of cam 53 to follower 56 forcing rod 37 and its associated spools further to the left (as shown in FIG. 3) to allow upstream pressure from pipe 5 to flow through second portion 34 to force seal 22 into sealing engagement.

A hand wheel 63 is associated with shaft 61 so that the cams 53 and 54 may be rotated manually if desired. It is seen that whether shaft 61 is rotated by the action of motor 62 or hand wheel 63, the sequence of movement between valves 31 and 40 is always maintained because of rotation of common shaft 61 on which cams 53 and 54 are fixed. A jaw clutch 60 is positioned on shaft 61 so that hand wheel 63 may be selectively engageable or disengageable, and in the usual operation hand wheel 63 is maintained disengaged by a spring (not shown) so it will not rotate when the system is operated by motor 62.

The upstream and downstream portions of pressure pipe 5 are connected by a conduit 66 which acts as a pressure fluid bypass around rotary valve 8. Conduit 66 includes a valve 67 which may be manually operated to equalize the pressure on either side of rotary valve 8. When valve 8 is closed, a tremendous difference in pressure exists between the upstream and downstream portions of pressure pipe 5. If valve 8 were opened under these conditions, the surge of pressure fluid would damage the apparatus. Accordingly, valve 67 is opened first to allow the downstream pressure to equalize the upstream pressure before valve 8 is opened.

The operating cycle for the hydraulically operated seal control mechanism will now be described. It is seen that rotary valve 8 is in the closed position in FIG. 1, and seal 22 has been moved into the retracted position. It is desired to open valve 8 to allow the upstream pressure fluid in pressure pipe 5 to flow through valve 8 to the hydraulic turbine. Normally with valve 8 in the closed position, seal 22 is engaged and valve assembly 31 would be in the position shown in FIG. 3, and this position will be assumed at the start of the cycle. Valve 67 would then be opened so that the flow of pressure fluid through conduit 66 equalizes the pressure on both sides of closed rotary valve 8.

Cam means 52 is then actuated, either by motor 62 or by hand wheel 63. As cam means 52 is actuated, a shorter radius of cam 53 is exposed to cam follower 56 and spring 38 forces rod 37 and its associated spools to the right to reach the position illustrated in FIG. 1. In this position spool 29 blocks fluid communication between conduits 33 and 49. Spool 27 is positioned to the right of the connection of conduit 32 with housing 39, which allows pressure fluid to flow from conduit 32 through conduit 33 against surface 20 of piston 26. Spool 30 is positioned to the right of the connection of drain conduit 50 allowing the drain of fluid from the downstream end of chamber 24 through conduits 34 and 50. It should be realized that surface 26 of seal 22 is exposed at all times to the pressure in pipe 5, and the pressure on surface 26 combined with the pressure on surface 20 will now force seal 22 to the right out of engagement with valve 8 into the retracted position shown in FIG. 1. When seal 22 moves to the right, any fluid in chamber 24 is forced through conduits 34 and 50 into an exhaust receiver (not shown).

While seal 22 is being retracted, cam 54 rotates without longitudinal movement maintaining spools 45 of valve 40 displaced to the right, as shown in dotted lines, so that the upstream pressure through conduits 48 and 42 maintains piston 18 to the right and valve 8 closed. Cam 54 maintains spools 45 in this dotted line position until the flow of pressure fluid through conduit 33 has completely retracted seal 22.

After seal 22 has been fully retracted from contact with rotary valve 8, cam 53 rotates without longitudinal movement maintaining valve assembly 31 in the position shown in FIG. 1 with seal 22 retracted. At this time the rotation of cam 54 exposes a smaller radius to cam follower 57. As the biasing action of spring 47 maintains cam follower 57 in contact with cam 54, spools 45 will slide to the full line position shown in FIG. 1. As open valve 67 has allowed pressure to build up downstream of valve 8, in this position of spools 45 pressure fluid will flow through conduit 41 including first part 43 to force piston 18 to the left. Rack 14 will thereupon be moved to the left corresponding to the movement of piston 18, and the associated pinion 13 will effect the rotation of shaft 9 so that rotary valve 8 will be moved to the open position. As piston 18 moves to the left, pressure fluid in cylinder 19 on the left side of piston 18 will be forced out through third conduit 42, through valve 40 and into drain outlet 51.

As previously explained, seal 22 had moved into the retracted position to the right before valve 8 was opened. Now with valve 8 open continued rotation of cam 53 exposes a larger radius to follower 56 so that rod 37 and its associated spools are moved to the left and positioned as shown in FIG. 4. Drain outlets 49 and 50 are blocked by spools 29 and 30. Spool 27 is positioned over the inlet opening 55 of conduit 32 into housing 39. It will be seen that the size of inlet opening 55 is sufficiently great that spool 27 cannot completely cover opening 55. As illustrated by FIG. 4, the radius of cam 53 as in this particular part of the cycle is such that spool 27 is centered over opening 55 with clearance for passage of pressure fluid from conduit 32 on either side of spool 27. Accordingly, in this position of cam means 52 after seal 22 has been retracted, pressure fluid flows into both conduits 33 and 34. As mentioned before, pipe line pressure is continually exerted on surface 26 and the total hydraulic force from the combined pressure on surfaces 20 and 26 is the same as the total hydraulic force from the pressure on surface 21 so seal 22 remains hydraulically balanced in the retracted position. However, as previously indicated, the pressure on surface 21 is sufficient to prevent silt and other impurities from leaking around the seal packing.

The position which the elements of the mechanism have now reached; that is, with valve 8 open and seal 22 in retracted position with pressure on surfaces 20, 21 and 26, is the usual operational position in which the mechanism remains the longest time. The rotation of cam means 52 is permitted to cease and all elements remain in the aforedescribed relation until it is desired to initiate a reversal of the cycle to close valve 8.

In practice one workable cam relationship has been determined on a 280 degrees clockwise angular rotation. The rotation can be considered as starting with valve 8 closed and seal 22 engaged. In the first 60 degrees of rotation a small radius of cam 53 allows valve assembly 31 to move to the retract position shown in FIG. 1 while cam 54 rotates without longitudinal movement. During the next 60 degrees of movement both cams rotate without longitudinal movement while seal 22 retracts, which takes approximately five seconds. In the next 100 degrees of rotation, cam 53 continues to rotate without longitudinal movement while a smaller radius of cam 54 allows spring 47 to move spools 45 to the left so that valve 8 will move to the open position. During the next 30 degrees of movement both cams rotate without longitudinal movement as valve assemblies 31 and 40 are maintained in the same position. In the final 30 degrees of movement, cam 54 continues to rotate without longitudinal movement while a larger radius of cam 53 moves valve assembly 31 into the position shown in FIG. 4.

To close valve 8 and engage seal 22, cams 53 and 54 are rotated in the opposite direction from the above described valve opening operation; that is, the cam means 52 would rotate counterclockwise. The starting operation and stopping of motor 62 is effected by a conventional electrical installation, such as limit switches (not shown). To insure complete opening and closing of rotary valve 8 during the cycle, whenever cam 54 has positioned valve assembly 40 to initiate such movement, limit switches on shaft 9 stop the rotation of cam means 52 until such movement is completed.

To close valve 8 and engage seal 22 the aforementioned counterclockwise rotation of cam means 52 is commenced. During this reverse part of the cycle, cam 53 which has placed valve assembly 31 into the position shown in FIG. 4 exposes a shorter radius to follower 56 so that valve assembly 31 moves into the retract position, shown in FIG. 1. During continued rotation of cam means 52, cam 53 rotates without longitudinal movement while cam 54 exposes a larger radius to follower 57 to move spools 45 to the right to the dotted line position. Pressure fluid in first conduit 32 will now flow through fourth conduit 48 and through valve 40 into third conduit 42 and then into servomotor 17 to force piston 18 to the right. Such movement of piston 18 effects corresponding movement of rack 14 so that valve 8 is rotated by pinion 13 to the closed position. When the valve 8 has fully closed, cam 54 rotates with a constant radius against follower 57 to cause spools 45 to remain in the dotted line position so that pressure fluid maintains piston 18 to the right and valve 8 closed. At this time the rotating part of cam 53 against follower 56 presents a larger radius so rod 37 and its associated spools are forced against biasing spring 38 to the position shown in FIG. 3. Spool 27 blocks fluid communication between conduits 32 and 33. However, fluid communication is possible between conduits 32 and 34 and fluid pressure is exerted on surface 21. Since the area of surface 21 is greater than the area of surface 26, the total hydraulic force on surface 21 is greater than the total hydraulic force on surface 26 and since there is no force on surface 20, seal 22 will move into the engaged position. As seal 22 slides into engagement, any fluid in the chamber adjacent surface 20 is forced into conduit 33 and out into drain 49.

When this closing operation has been completed, actuation of cam means 52 will cease as one of the aforementioned limit switches is actuated, and cams 53 and 54 will maintain valve assembly 31 in the position shown in FIG. 3 and valve assembly 40 in the dotted line position shown in FIG. 1.

After rotary valve 8 is closed, valve 67 is also closed so there will be no downstream pressure with the mechanism in the closed position. Since it is seen that the opening of valve 8 depends upon downstream pressure, a safety feature is thereby incorporated in the system as opening of valve 8 cannot take place until the fluid pressure is at least partially equalized between upstream and downstream sides of the valve 8 preferably by the opening of valve 67 so that the mechanism is not damaged.

It should be pointed out that it would be possible to cause the seal 22 to retract without opening the valve 67. This would cause the fluid to rush to the downstream side of the valve 8 providing sufficient pressure to actuate the ram 17 and open the valve 8. However, the high velocity of the fluid moving from the upstream high pressure side of the valve 8 to the low pressure downstream side of the valve 8 could cause damage unless the valve was constructed of considerably strong material which would add to the expense of the valve. It is, therefore, preferred that the pressure on both sides of the valve 8 be equalized by opening the valve 67 before the valve 8 is opened.

It will be understood that the previously described cycle of operation depends upon the energization of motor 62. The starting, stopping and reversal of motor 62 from opening operation to closing operation is initiated by the previously mentioned limit switches energized by rotation of cam means 52 once an operator has started a cycle of operation by a push button.

It will be seen that the present hydraulically operated mechanism affords a control for the opening and closing of a rotary valve and its associated seal so that a sequence of operation is maintained by an actuating means so as to prevent any damage being done to the parts of the mechanism. Specifically it is seen that a pair of cams on a common shaft are rotated to position the actuating sliding valves in a sequential operation for the opening and closing of a rotary valve and its associated seal.

The particular embodiment of the invention illustrated and described relates to a rotary valve. However, this embodiment is to be considered illustrative only as other forms of valves, such as butterfly valves, gate valves or any other valve having an associated, retractible seal can be operated in a sequential relationship by the aforedescribed control. Accordingly, the present invention includes such other modifications and equivalents that may readily occur to those skilled in the art, within the scope of the appended claims.

What is claimed is:

1. The combination of a hydraulically operated mechanism and a control therefor comprising a pressure fluid containing means having an element movably positioned therein, operating means associated with said element for selectively actuating said element to regulate the starting and stopping of the flow of pressure fluid in said pressure fluid containing means, sealing means positioned within said pressure fluid containing means and adapted to be placed in sealing association with said element, a first valve means hydraulically connected between said sealing means and an upstream portion of said pressure fluid containing means, a second valve means hydraulically connected between said operating means and a downstream portion of said pressure fluid containing means, actuating means associated in operative relationship with said first and second valve means and adapted to sequentially operate both said valve means so that said first valve means will cause said upstream pressure to retract said sealing means from sealing association with said element before said second valve means can cause said downstream pressure to actuate said operating means and said element to start the flow of pressure fluid.

2. The combination of a hydraulically operated mechanism and a control therefor comprising a pressure fluid containing means having an element rotatably mounted therein, operating means associated with said element for selectively actuating said element to regulate the starting and stopping of the flow of pressure fluid in said pressure fluid containing means, sealing means positioned within said pressure fluid containing means and adapted to be placed in sealing contact with said element in closed position, a first valve means hydraulically connected between said sealing means and an upstream portion of said pressure fluid containing means, a second valve means hydraulically connected between said operating means and an upstream portion of said pressure fluid containing means and hydraulically connected between said operating means and downstream portion of said pressure fluid containing means, actuating means associated in operative relationship with said first and second valve means and adapted to sequentially operate both said valve means so that said first valve means will cause said upstream pressure to retract said sealing means from sealing contact with said element before said second valve means can cause said downstream pressure to actuate said operating means and said element to start the flow of pressure fluid, and said actuating means further adapted to sequentially operate both said valve means so that said second valve means can cause said upstream pressure to actuate said operating means and said element to stop the flow of pressure fluid before said first valve means can cause said upstream pressure to place said sealing means in sealing contact with said element.

3. The combination of a hydraulically operated mechanism and a control therefor comprising a pressure pipe having a rotary valve operably mounted therein, operating means associated with said rotary valve for selectively opening and closing said rotary valve to regulate the starting and stopping of the flow of pressure fluid in said pipe, sealing means positioned within said pipe adapted to be placed in sealing contact with said rotary valve in closed position, a first valve means hydraulically connected between said sealing means and an upstream portion of said pipe, a second valve means hydraulically connected between said operating means and an upstream portion of said pipe and hydraulically connected between said operating means and a downstream portion of said pipe, cam means associated in operative relationship with said first and second valve means and adapted to sequentially operate said valve means so that said first valve means will cause said upstream pressure to retract said sealing means from sealing contact with said rotary valve before said second valve means can cause said downstream pressure to actuate said operating means to open said rotary valve, and said cam means further adapted to sequentially operate said valve means so that said second valve means can cause said upstream pressure to actuate said operating means to close said rotary valve before said first valve means can cause said upstream pressure to place said sealing means in sealing contact with said rotary valve.

4. The combination of a hydraulically operated mechanism and a control therefor comprising a pressure pipe having a rotary valve operably mounted therein, operating means associated with said rotary valve for selectively opening and closing said rotary valve to regulate the starting and stopping of the flow of pressure fluid in said pipe, sealing means positioned within said pipe adapted to be placed in sealing contact with said rotary valve in closed position, a first conduit connecting said sealing means with an upstream portion of said pipe and having a first valve means positioned therebetween, a second conduit connecting said operating means with a downstream portion of said pipe and having a second valve means positioned therebetween, a third conduit connecting said second valve means with said operating means, a fourth conduit connecting said second valve means with said first conduit, cam means associated in operative relationship with said first and second valve means and adapted to sequentially operate both said valve means so that said first conduit is directly connected with said sealing means to cause said upstream pressure to retract said sealing means from sealing contact with said rotary valve before said second conduit is directly connected with said operating means to cause said downstream pressure to actuate said operating means to open said rotary valve, and said cam means further adapted to sequentially operate both said valve means so that said fourth conduit is connected through said third conduit to said operating means to cause said upstream pressure to actuate said operating means to close said rotary valve before said first conduit is directly connected to said sealing means to cause said upstream pressure to place said sealing means in sealing contact with said rotary valve.

5. The combination of a hydraulically operated mechanism and a control therefor comprising a pressure pipe having a rotary valve operably mounted therein, a servomotor associated with said rotary valve for selectively opening and closing said rotary valve to regulate the starting and stopping of the flow of pressure fluid in said pipe, a longitudinally sliding seal positioned within said pipe adapted to be placed in sealing contact with said rotary valve in closed position, a first conduit connecting said sliding seal with an upstream portion of said pipe and having a first sliding valve positioned therebetween, said first conduit having a first portion thereof connecting said first sliding valve and one side of said sliding seal and a second portion thereof connecting said first sliding valve and the other side of said sliding seal, a second conduit connecting said servomotor with a downstream portion of said pipe and having a second sliding valve positioned therebetween, said second conduit having a first part thereof connecting said second sliding valve and one end of said servomotor, a third conduit connecting said second sliding valve and the other end of said servomotor, a fourth conduit connecting said second sliding valve with said first conduit, a first cam operably mounted to actuate said first sliding valve, a second cam operably mounted to actuate said second sliding valve, said cams associated to operate said sliding valves sequentially so that said first cam can position said first valve so that one of said portions is directly connected with one side of said sliding seal to cause said upstream pressure to slide said seal out of sealing contact with said rotary valve before said second cam can position said second valve so that said first part is directly connected with one end of said servomotor to cause said downstream pressure to actuate said servomotor to open said rotary valve, and said cams further adapted to sequentially operate said sliding valves so that said second cam can position said second valve so that said fourth conduit is connected through said third conduit to the other end of said servomotor to cause said upstream pressure to actuate said servomotor to close said rotary valve before said first cam can position said first valve so that said first conduit including the other of said portions is directly connected to the other side of said sliding seal to cause said upstream pressure to slide said seal into sealing contact with said rotary valve.

6. The combination of a hydraulically operated mechanism and a control therefor comprising a pressure pipe having a rotory valve operably mounted therein, a servomotor associated with said rotary valve for selectively opening and closing said rotary valve to regulate the starting and stopping of the flow of pressure fluid in said pipe, a longitudinally sliding seal positioned within said pipe adapted to be placed in sealing contact with said rotary valve in closed position, a first sliding valve hydraulically connected between said sliding seal and an upstream portion of said pipe, a second sliding valve hydraulically connected between said servomotor and an upstream portion of said pipe and hydraulically connected between said servomotor and a downstream portion of said pipe, a first cam associated with said first sliding valve, a second cam associated with said second sliding valve, a shaft on which both said cams are mounted, said shaft adapted to simultaneously rotate said cams to impart sequential operation of said sliding valves so that said first sliding valve will cause said upstream pressure to retract said sliding seal from sealing contact with said rotary valve before said second sliding valve can cause said downstream pressure to actuate said servomotor to open said rotary valve, said shaft further adapted to rotate said cams to actuate said sliding valves sequentially so that said second sliding valve can cause said upstream pressure to actuate said servomotor to close said rotary valve before said first sliding valve can cause said upstream pressure to place said sliding seal into sealing contact with said rotary valve.

7. The combination of a hydraulically operated mechanism and a control therefor comprising a pressure pipe having a rotary valve operably mounted therein, a servomotor associated with said rotary valve for selectively opening and closing said rotary valve to regulate the starting and stopping of the flow of pressure fluid in said pipe, a longitudinally sliding seal positioned within said pipe adapted to be placed in sealing contact with said rotary valve in closed position, a first conduit connecting said sliding seal with an upstream portion of said pipe and having a first sliding valve positioned therebetween, a second conduit connecting said servomotor with a downstream portion of said pipe and having a second sliding valve positioned therebetween, a third conduit connecting said second sliding valve with said servomotor, a fourth conduit connecting said second sliding valve with said first conduit, a first cam associated with said first sliding valve, a second cam associated with said second sliding valve, a shaft on which both said cams are mounted, said shaft adapted to simultaneously rotate said cams to impart sequential operation to said sliding valves, said first cam actuating said first sliding valve to connect said first conduit directly with said sliding seal to cause said upstream pressure to retract said sliding seal from sealing contact with said rotary valve before said second cam actuates said second sliding valve to connect said second conduit directly with said servomotor to cause said downstream pressure to actuate said servomotor to open said rotary valve, and said shaft further adapted to simultaneously rotate said cams for sequential operation of said sliding valves so that said second cam actuates said second sliding valve to connect said fourth conduit through said second sliding valve and said third conduit directly to said servomotor to cause said upstream pressure to actuate said servomotor to close said rotary valve before said first cam actuates said first sliding valve to connect said first conduit directly to said sliding seal to cause said upstream pressure to place said sliding seal in sealing contact with said rotary valve.

8. The combination of a hydraulically operated mechanism and a control therefor comprising a pressure pipe having a rotary valve operably mounted therein, a servomotor associated with said rotary valve for selectively opening and closing said rotary valve to regulate the starting and stopping of the flow of pressure fluid in said pipe, a longitudinally sliding seal positioned within said pipe adapted to be placed in sealing contact with said rotary valve in closed position, a first conduit connecting said sliding seal with an upstream portion of said pipe and having a first sliding valve positioned therebetween, said first conduit having a first portion thereof connecting said first sliding valve and one side of said sliding seal and a second portion thereof connecting said first sliding valve and the other side of said sliding seal, a second conduit connecting said servomotor with a downstream portion of said pipe and having a second sliding valve positioned therebetween, said second conduit having a first part thereof connecting said second sliding valve and one end of said servomotor, a third conduit connecting said second sliding valve and the other end of said servomotor, a fourth conduit connecting said second sliding valve with said first conduit, a first cam associated with said first sliding valve, a second cam associated with said second sliding valve, a shaft on which both said cams are so mounted that rotation of said shaft causes said cams to impart sequential operation to said sliding valves, said shaft rotation causing said first cam to actuate said first sliding valve to connect said first portion of said first conduit directly with one side of said sliding seal to cause said upstream pressure to retract said sliding seal from sealing contact with said rotary valve before said second cam actuates said second sliding valve to connect said first part of said second conduit directly with said servomotor to cause said downstream pressure to actuate said servomotor to open said rotary valve, and said shaft adapted to rotate further to cause said second cam to actuate said second sliding valve to connect said fourth conduit through said second sliding valve and said third conduit to the other end of said servomotor to cause said upstream pressure to actuate said servomotor to close said rotary valve before said first cam can actuate said first sliding valve to connect said second portion of said first conduit directly to the other side of said sliding seal to cause said upstream pressure to slide said seal into sealing contact with said rotary valve.

9. The combination of a hydraulically operated mechanism and a control therefor comprising a pressure pipe having a rotary valve operably mounted therein, operating means associated with said rotary valve for selectively opening and closing said rotary valve to regulate the starting and stopping of the flow of pressure fluid in said pipe, sealing means positioned within said pipe adapted to be placed in sealing contact with said rotary valve in closed position, a first valve means hydraulically connected between said sealing means and an upstream portion of said pipe, a second valve means hydraulically connected between said operating means and an upstream portion of said pipe and hydraulically connected between said operating means and a downstream portion of said pipe, cam means associated in operative relationship with said first and second valve means and adapted to operate said valve means so that said first valve means will cause said upstream pressure to maintain said sealing means in retracted position out of contact with said rotary valve and direct pressure fluid in opposing directions onto said sealing means at the same time said second valve means causes said downstream pressure through said operating means to maintain said rotary valve in the open position.

10. The combination of a hydraulically operated mechanism and a control therefor comprising a pressure pipe having a rotary valve operably mounted therein, operating means associated with said rotary valve for selectively opening and closing said rotary valve to regulate the starting and stopping of the flow of pressure fluid in said pipe, sealing means positioned within said pipe adapted to be placed in sealing contact with said rotary valve in closed position, a first conduit connecting said sealing means with an upstream portion of said pipe and having a first valve means positioned therebetween, a second conduit connecting said operating means with a downstream portion of said pipe and having a second valve means positioned therebetween, a third conduit connecting said second valve means with said operating means, a fourth conduit connecting said second valve means with said first conduit, cam means associated in operative relationship with said first and said second valve means and adapted to sequentially operate both said valve means so that said first conduit is directly connected with said sealing means to cause said upstream pressure to retract said sealing means from sealing contact with said rotary valve before said second conduit is directly connected with said operating means to cause said downstream pressure to actuate said operating means to open said rotary valve, said cam means further adapted to operate said first valve means to cause said upstream pressure to maintain said sealing means in retracted position out of contact with said rotary valve and direct pressure fluid in opposing directions onto said sealing means at the same time said second valve means causes said downstream pressure through said operating means to maintain said rotary valve in the open position, and said cam means still further adapted to sequentially operate both said valve means so that said fourth conduit is connected through said third conduit to said operating means to cause said upstream pressure to actuate said operating means to close said rotary valve before said first conduit is directly connected to said sealing means to cause said upstream pressure to place said sealing means in sealing contact with said rotary valve.

11. The combination of a hydraulically operated mechanism and a control therefor comprising a pressure pipe having a rotary valve operably mounted therein, a servomotor associated with said rotary valve for selectively opening and closing said rotary valve to regulate the starting and stopping of the flow of pressure fluid in said pipe, a longitudinally sliding seal positioned within said pipe adapted to be placed in sealing contact with said rotary valve in closed position, said sliding seal having a transverse surface facing downstream and a pair of transverse surfaces facing upstream, a first conduit connecting said sliding seal with an upstream portion of said pipe and having a first sliding valve positioned therebetween, said first conduit having a first portion thereof connecting said first sliding valve to one of said upstream surfaces of said sliding seal and a second portion thereof connecting said first sliding valve to said downstream surface of said sliding seal, a second conduit connecting said servomotor with a downstream portion of said pipe and having a second sliding valve positioned therebetween, said second conduit having a first part thereof connecting said second sliding valve and one end of said servomotor, a third conduit connecting said second sliding valve and the other end of said servomotor, a fourth conduit connecting said second sliding valve with said first conduit, a first cam associated with said first sliding valve, a second cam associated with said second sliding valve, a shaft on which both said cams are so mounted that rotation of said shaft causes said cams to impart sequential operation to said sliding valves, said shaft rotation causing said first cam to actuate said first sliding valve to connect said first portion of said first conduit directly to said one of said upstream facing surfaces of said sliding seal to cause upstream pressure to retract said sliding seal from sealing contact with said rotary valve before said second cam actuates said second sliding valve to connect said first part of said second conduit directly with said one end of said servomotor to cause said downstream pressure to actuate said servomotor to open said rotary valve, said shaft adapted to rotate further to cause said first cam to operate said first valve means to cause said upstream pressure to flow through said first and second portions and be simultaneously directed onto said upstream and downstream surfaces of said sliding seal, the hydraulic forces acting on said upstream facing surfaces being substantially equal to the hydraulic forces acting on said downstream facing surface so as to maintain said sealing means in a substantially balanced hydraulic retracted position out of sealing contact with said rotary valve while said second valve means causes said downstream pressure through said one end of said servomotor to maintain said rotary valve in the open position, and said shaft adapted for additional rotation to cause said second cam to actuate said second sliding valve to connect said fourth conduit through said second sliding valve and said third conduit to the other end of said servomotor to cause said upstream pressure to actuate said servomotor to close said rotary valve before said first cam can actuate said first sliding valve to connect said second portion of said first conduit directly to the downstream facing surface of said sliding seal to cause said upstream pressure to slide said seal into sealing contact with said rotary valve.

12. The combination of a hydraulically operated mechanism and a control therefor comprising a pressure fluid containing means having an element movably positioned therein, operating means associated with said element for selectively actuating said element to regulate the starting and stopping of the flow of pressure fluid in said pressure fluid containing means, sealing means positioned within said pressure fluid containing means and adapted to be placed in sealing association with said element, a first valve means hydraulically connected between said sealing means and an upstream portion of said pressure fluid containing means, a second valve means hydraulically connected between said operating means and a downstream portion of said pressure fluid containing means, actuating means associated in operative relationship with said first and second valve means and adapted to sequentially operate both said valve means so that said first valve means will cause said upstream pressure to retract said sealing means from sealing association with said element before said second valve means can cause said downstream pressure to actuate said operating means and said element to start the flow of pressure fluid, conduit means connecting the upstream portion of said pressure fluid containing means with the downstream portion thereof and a stop valve in said conduit means selectively positionable to interrupt and permit fluid flow through said conduit means.

References Cited in the file of this patent

UNITED STATES PATENTS

| | | |
|---|---|---|
| 1,643,753 | Slattery | Sept. 27, 1927 |
| 1,834,870 | Rogers | Dec. 1, 1931 |
| 2,653,004 | Schnyder | Sept. 22, 1953 |
| 2,873,761 | Tailleferre | Feb. 17, 1959 |

FOREIGN PATENTS

| | | |
|---|---|---|
| 520,188 | Germany | Feb. 19, 1931 |
| 530,687 | Germany | July 16, 1931 |
| 684,621 | Great Britain | Dec. 24, 1952 |
| 1,155,199 | France | Nov. 25, 1957 |